United States Patent
Shimizu et al.

[11] Patent Number: 6,008,279
[45] Date of Patent: Dec. 28, 1999

[54] VINYL CHLORIDE RESIN COMPOSITION AND METHOD FOR PRODUCING THE SAME

[75] Inventors: Hikaru Shimizu; Yoshihiro Nakatsuji, both of Chiba; Junzo Ukai; Hideo Nishimura, both of Aichi; Toshihiko Nakamura, Aichi, all of Japan

[73] Assignees: Sumitomo Chemical Company Limited, Osaka; Toyota Jidosha Kabushiki Kaisha, Aichi-ken, both of Japan

[21] Appl. No.: 08/953,282

[22] Filed: Oct. 17, 1997

[30] Foreign Application Priority Data

Oct. 18, 1996 [JP] Japan .................................. 8-276400

[51] Int. Cl.$^6$ ...................................................... C08K 5/09
[52] U.S. Cl. .............................................................. 524/298
[58] Field of Search ...................................... 524/569, 298

[56] References Cited

U.S. PATENT DOCUMENTS

| | | | |
|---|---|---|---|
| 3,988,493 | 10/1976 | Yallourakis | 523/442 |
| 5,036,124 | 7/1991 | Igarashi | 524/298 |
| 5,444,110 | 8/1995 | Kitazawa | 524/100 |
| 5,677,356 | 10/1997 | Shimizu | 521/73 |

FOREIGN PATENT DOCUMENTS

| | | |
|---|---|---|
| 0543501A1 | 5/1993 | European Pat. Off. . |
| 5-279485 | 10/1993 | Japan . |

OTHER PUBLICATIONS

Chemical Abstracts, vol. 127, No. 3, Jul. 21, 1997, Abstract No. 35107.
Chemical Abstracts, vol. 111, No. 26, Dec. 25, 1989, Abstract No. 234492.
Chemical Abstract, vol. 112, No. 16, Apr. 16, 1990, Abstract No. 140568.
Derwent, Section Ch, Week 9224, Class A14, AN 92–196832, XP–002090835, Apr. 30, 1992.

*Primary Examiner*—Paul R. Michl
*Attorney, Agent, or Firm*—Birch, Stewart, Kolasch & Birch, LLP

[57] ABSTRACT

A vinyl chloride resin composition for powder molding containing 100 wt. parts of a granular vinyl chloride resin having an average polymerization degree of between 1000 and 1200, 75 to 81 wt. parts of a trimellitate plasticizer, and 2 to 20 wt. parts of a fine powder vinyl chloride resin having an average polymerization degree of between 600 and 1000, which has excellent powder-dropping and melting properties, and can be readily powder molded to give molded articles having good elongation at low temperature and also very low glass-hazing properties.

9 Claims, No Drawings

VINYL CHLORIDE RESIN COMPOSITION AND METHOD FOR PRODUCING THE SAME

BACKGROUND OF THE INVENTION

1. Field of the Invention

The present invention relates to a vinyl chloride resin composition suitable for powder molding and a method for preparing the same.

2. Description of the Prior Art

As covering materials of interior parts of automobiles, resinous molded articles with high quality appearance are used which have light weights and good soft feeling, and also leather grain, stitch and the like on their decorative surfaces.

Such molded articles are produced by powder molding a vinyl chloride resin composition for powder molding comprising a granular vinyl chloride resin in which, plasticizers, stabilizers, pigments and the like are dry blended and also a fine powder vinyl chloride resin is uniformly dispersed.

A typical example of the interior parts of the automobiles which uses such molded articles as the covering materials is an instrument panel.

In these years, automobiles installing an air bag for an assistant seat in an instrument panel have been widely used. As such air bags, air bags are proposed which are installed under the covering materials of instrument panels for hiding and break the covering materials to inflate in operation.

It is required for molded articles used as such covering materials of instrument panels under which such an air bag is installed to break the covering materials by inflation, and also to prevent the scattering of broken pieces on breaking at low temperature and form the broken pieces having less sharp edges, that is, to have a sufficient elongation at low temperature. An example of such covering materials is a molded article produced by powder molding a vinyl chloride resin composition for powder molding which has been prepared using a relatively large amount of a plasticizer during dry blending.

Instrument panels are often heated to high temperature. Thus, molded articles used as the covering materials of such instrument panels are required not to contain materials which evaporate at high temperature and adhere to and cloud windshields. That is, the molded articles should have low glass-hazing properties.

In general, vinyl chloride resin compositions for powder molding are required to be easily molded and to provide molded articles having less irregular thicknesses. Thus, such resin compositions should have good powder-cutting off and melting properties.

However, there have been no vinyl chloride resin compositions for powder molding which have a sufficient elongation at low temperature, provide molded articles having low glass-hazing properties, and have excellent powder-dropping and melting properties.

SUMMARY OF THE INVENTION

An object of the present invention is to provide a vinyl chloride resin composition for powder molding which has a sufficient elongation at low temperature, provides molded articles having low glass-hazing properties, and also has excellent powder-dropping and melting properties.

Accordingly, the present invention provides a vinyl chloride resin composition for powder molding comprising 100 wt. parts of a granular vinyl chloride resin having an average polymerization degree of between 1000 and 1200, 75 to 81 wt. parts of a trimellitate plasticizer, and 2 to 20 wt. parts of a fine powder vinyl chloride resin having an average polymerization degree of between 600 and 1000.

The present invention also provides a method for preparing a vinyl chloride resin composition for powder molding comprising the steps of:

dry blending 100 wt. parts of a granular vinyl chloride resin having an average polymerization degree of between 1000 and 1200, and 75 to 81 wt. parts of a trimellitate plasticizer to obtain an intermediate composition, and then dispersing 2 to 20 wt. parts of a fine powder vinyl chloride resin having an average polymerization degree of between 600 and 1000 in the intermediate composition.

DETAILED DESCRIPTION OF THE INVENTION

A granular vinyl chloride resin contained in the vinyl chloride composition for powder molding according to the present invention may be prepared by suspension polymerization, bulk polymerization or the like, and preferably has an average particle size of between 50 and 300 μm.

Examples of the vinyl chloride resin in the granular form are polyvinyl chloride, copolymers of vinyl chloride and at least one other monomer which is copolymerizable with vinyl chloride (e.g. ethylene, propylene, vinyl acetate, etc.), a graft polymer of vinyl chloride on ethylene-vinyl acetate copolymer, and mixtures thereof.

The content of vinyl chloride in the above copolymer or graft polymer is preferably at least 50 wt. %.

The granular vinyl chloride resin should have an average polymerization degree of between 1000 and 1200. Herein, an average polymerization degree is measured by the method according to JIS K-6721.

When the average polymerization degree is less than 1000, the vinyl chloride resin tends to provide a molded article containing a relatively large amount of materials which evaporate at high temperature. When the average polymerization degree exceeds 1200, a resin composition has inferior melting properties, and also becomes wet powder. Thus, the powder molding of such a composition may be difficult.

The trimellitate plasticizer means esters of trimellitic acid three carboxyl groups of which are esterified with an alcohol. Preferable examples of the alcohol are those having 6 to 10 carbon atoms.

Specific examples of the trimellitate esters include tri-n-octyl trimellitate, tri-2-ethylhexyl trimellitate, tridecyl trimellitate, and the like.

The trimellitate plasticizers may be used independently or in admixture of two or more of them.

The amount of the trimellitate plasticizer is in a range between 75 and 81 wt. parts per 100 wt. parts of the granular vinyl chloride resin. When the amount of the plasticizer is less than 75wt. parts, the composition has inferior melting properties and thus the powder molding of the composition tends to become difficult. When the amount of the plasticizer exceeds 81 wt. parts, the composition has inferior powder-dropping properties, and tends to provide molded articles having irregular thicknesses.

The fine powder vinyl chloride resin is used to prevent mutual adhesion of the particle of the granular vinyl chloride resin in the resin composition of the present invention. In general, vinyl chloride resins prepared by emulsion polymerization, microemulsion polymerization, or the like are used. The fine powder vinyl chloride resin preferably has an average particle size of between 0.1 nd 10 µm.

Examples of the vinyl chloride resin in the fine powder form are polyvinyl chloride, copolymers of vinyl chloride and at least one other monomer which is copolymerizable with vinyl chloride (e.g. ethylene, propylene, vinyl acetate, etc.), a graft polymer of vinyl chloride on ethylene-vinyl acetate copolymer, and mixtures thereof.

The content of vinyl chloride in the above copolymer or graft polymer is preferably at least 50 wt. %.

The fine powder vinyl chloride resin has an average polymerization degree of between 600 and 1000, preferably between 700 and 900.

When the polymerization degree is less than 600, the resin composition tends to provide a molded article having less elongation or low strength at low temperature. When the polymerization degree exceeds 1000, the resin composition tends to have low melting properties.

The amount of the fine powder vinyl chloride resin should be in a range between 2 and 20 wt. parts, preferably between 7 and 13 wt. parts, per 100 wt. parts of the granular vinyl chloride resin. When the amount of the fine powder vinyl chloride resin is less than 2 wt. parts, effects for preventing mutual adhesion of the particles of the granular vinyl chloride resin are insufficient. When the amount of the fine powder vinyl chloride resin exceeds 20 wt. parts, it is difficult to disperse the fine powder in the composition uniformly, and thus the composition tends to provide molded articles having inferior appearance.

The resin composition of the present invention may contain various additives which are commonly used. Examples of such additives are stabilizers, pigments, mold release agents, flame retardants, fillers, crosslinking agents, antistatic agents, surface-treating agents, lubricants, processing aids, anti-plate-out agents, fungicides, and the like.

Examples of the stabilizer are salts of carboxylic acids with metals such as zinc, lithium, sodium, barium, calcium, magnesium, tin, etc. Among them, composite stabilizers are preferable. Additional examples of the stabilizer are perchlorate compounds (e.g. sodium perchlorate, perchlorate type hydrotalcites, etc.), epoxide compounds (e.g. epoxidized soybean oil, epoxidized linseed oil, epoxidized castor oil, etc.), polyhydric alcohols (e.g. pentaerythritol, dipentaerythritol, mannitol, glycerol, etc.), β-diketo compounds (e.g. stearoylbenzoylmethane, dibenzoylmethane, benzoylacetone, etc.), antioxidant, UV-light absorbers, hindered amine base light stabilizers, and the like.

Examples of the pigments are organic pigments (e.g. azo and phthalocyanine base pigments, etc.), inorganic pigments (e.g. titanium oxide, carbon black, etc.) and the like.

The vinyl chloride resin composition of the present invention may be prepared by any conventional method. Preferably, the resin composition of the present invention is prepared by dry blending the granular vinyl chloride resin, trimellitate plasticizer and optional additives to obtain an intermediate composition, and then uniformly dispersing the fine powder vinyl chloride resin in the intermediate composition.

The dry blending can be carried out by a conventional method using a blender, a high speed mixer or the like. That is, the trimellitate plasticizer is added to the granular vinyl chloride resin which is being stirred while heating. When any additives are used, they may be added before, during or after the addition of the trimellitate plasticizer. Alternatively, the trimellitate plasticizer and additives are beforehand mixed, and then added to the granular vinyl chloride resin.

Then, the fine powder vinyl chloride resin is dispersed in the intermediate composition comprising the granular vinyl chloride resin and trimellitate plasticizer using a blender, a high speed mixer or the like, during or after cooling the intermediate composition.

The vinyl resin composition for powder molding according to the present invention has excellent powder-dropping and melting properties, and can be readily powder molded to give molded articles. The powder molding method is not limited, and for example, powder slush molding, rotational powder molding, fluidization dip coating, and the like may be used.

The molded article produced from the resin composition of the present invention has good elongation at low temperature and also very low glass-hazing properties.

EXAMPLES

The present invention will be illustrated by the following Examples, which do not limit the scope of the present invention in any way.

In the Examples, vinyl chloride resin compositions and molded articles were evaluated as follows:

Melting properties

A mass of a vinyl chloride resin composition for powder molding was applied on a surface of a temperature-gradient plate (GEIGY GRADE D BLOCK manufactured by WALLACE. temperature from 190° C. to 250° C.) at a thickness of 1 mm. After one minute, the surface of the resin composition was observed, and a melting point was read from a boundary temperature between the molten part and unmolten part. The results were evaluated using the following criteria:

Melting point less than 220° C., excellent melting properties

Melting point from 220° C. to less than 230° C., good melting properties

Melting point from 230° C. to less than 240° C., slightly inferior melting properties Melting point of 240° C. or higher, inferior melting properties Powder-dropping properties Seventy-five grams of a vinyl chloride resin composition for powder molding was filled in an aluminum cup having an inner diameter of 73 mm and a depth of 25 mm, and placed on a hot plate heated at 150° C. for 2 minutes. Then, the cup was removed from the hot plate and turned upside down, and the weight of the composition remaining on the bottom of the cup was measured. The powder-dropping properties were evaluated using the following criteria:

Weight of remaining composition of less than 21 g, Excellent powder-dropping properties Weight of remaining composition of from 21 g to less than 26 g, Good powder-dropping properties Weight of remaining composition of from 26 g to less than 31 g, Slightly inferior powder-dropping properties Weight of remaining composition of 31 g or higher, Inferior powder-dropping properties

Glass hazing properties

A plate-form molded article having a thickness of 1 mm was cut out, and a disc having a diameter of 80 mm was obtained and used as a test piece. The test piece was dried in a desiccator for at least 24 hours, and then placed in a glass container of a wind fogging screen tester (WSF-1 manufactured by SUGA SHIKENKI). The container was sealed with a glass plate. Then, the test was carried out at an oil bath temperature of 100° C. and a glass plate temperature of 200° C. for 20 hours.

After that, the reflectance (R) on the glass plate was measured at a reflection angle of 60 degrees using a gloss meter (UGV-5G manufactured by SUGA SHIKENKI). Then, a degree of glass haze (B) was calculated from the reflectance (R) and the original reflectance ($R_0$) of the glass plate prior to testing according to the following equation:

Degree of glass haze B (%)=(R/$R_0$) ×100

The results were ranked according to the following criteria:

B of 90% or higher, very low glass-hazing properties
B of from 85% to less than 90%, low glass-hazing properties
B of from 80% to less than 85%, slightly high glass-hazing properties
B of less than 80%, high glass-hazing properties

Elongation at low temperature

A No. 1 dumbbell according to JIS K-6301 was cut out from a plate-form molded article having a thickness of 1 mm, and gages were marked at a distance of 40 mm to obtain a test piece.

The test piece was maintained at 230° C., 50% RH for 24 hours, and placed in a constant temperature chamber kept at −35° C. After 20 minutes, the test piece was pulled at −350° C. at a pulling rate of 200 mm/min., and an elongation of the distance between the gages at break was measured. The results were ranked according to the following criteria:

Elongation of 150% or larger, excellent elongation at low temperature
Elongation of from 100% to less than 150%, good elongation at low temperature
Elongation of from 50% to less than 100%, slightly inferior elongation at low temperature
——: Elongation of less than 50%, inferior elongation at low temperature

Example 1

(1) Preparation of a vinyl chloride resin composition for powder molding

A granular vinyl chloride resin (ZEST 1000S manufactured by SHIN-DAIICHI ENBI KABUSHIKIKAISHA; average polymerization degree: 1050, average particle size: 120μm) (100 wt. parts) was supplied in a high speed mixer and stirred while heating. When the temperature rose to 80° C., a trimellitate plasticizer (tri-n-octyl trimellitate) (76 wt. parts), epoxidized soybean oil (O-130P manufactured by ASAHI DENKA KABUSHIKI-KAISHA) (2 wt. parts), a white pigment (titanium oxide) (3 wt. parts) and a barium-zinc base complex stabilizer (8 wt. parts) were added into the mixer while heating and stirring.

Stirring and heating were continued further. After the temperature rose to 120° C., the mixture was cooled. When the mixture was cooled to 60° C., a fine powder vinyl chloride resin (ZEST PQLTx manufactured by SHIN-DAIICHI ENBI KABUSHIKIKAISHA; average polymerization degree: 800; average particle size: 1 μm) (10 wt. parts) was added and homogeneously dispersed in the mixture, and a vinyl chloride resin composition for powder molding was produced.

The results of evaluations of this composition are listed in the Table.

(2) Production of a molded article

The vinyl chloride resin composition for powder molding produced in the above step (1) was supplied on a molding surface of a mold for powder molding which had been heated to 230° C., and fused together. Then, the unfused portion of the composition was shaken off so that the thickness of a molded article was 1 mm.

After cooling, the molded article was removed from the mold.

The results of evaluation of this molded article are also listed in the Table.

Examples 2 and 3 and Comparative Examples 5 to 9

A vinyl chloride resin composition for powder molding and a molded article were produced in the same manner as in Example 1 except that the amount of the trimellitate plasticizer was changed as shown in the Table. The results of evaluations are shown in the Table.

Comparative Examples 1 to 4

A vinyl chloride resin composition for powder molding and a molded article were produced in the same manner as in Example 1 except that a granular vinyl chloride resin (ZEST 800 GT manufactured by SHIN-DAIICHI ENBI KABUSHIKIKAISHA; average polymerization degree: 800, average particle size: 120 μm) was used in place of the vinyl chloride resin having the average polymerization degree of 1050, and the amount of the trimellitate plasticizer was changed as shown in the Table. The results of evaluations are shown in the Table.

Comparative Examples 10 and 11

A vinyl chloride resin composition for powder molding and a molded article were produced in the same manner as in Example 1 except that a granular vinyl chloride resin (ZEST 1300Z manufactured by SHI N-DAIICHI ENBI KABUSHIKI KAISHA, average polymerization degree: 1300, average particle size: 120 μm) was used in place of the vinyl chloride resin having the average polymerization degree of 1050, and the amount of the trimellitate plasticizer was changed as shown in the Table. The results of evaluations are shown in the Table.

Comparative Example 12

It was tried to produce a vinyl chloride resin composition for powder molding in the same manner as in Example 1 except that a granular vinyl chloride resin (ZEST 1300Z manufactured by SHIN-DAIICHI ENBI KABUSHIKIKAISHA; average polymerization degree: 1300, average particle size: 120 μm) was used in place of the vinyl chloride resin having the average polymerization degree of 1050, and the amount of the trimellitate plasticizer was changed to 89 wt. parts. However, only a wet composition was obtained, and could not be powder molded.

TABLE

| Example No. | Average polymerization degree | Plasticizer (wt. parts) | Melting properties | Powder-dropping properties | Glass hazing | Elongation (%) |
|---|---|---|---|---|---|---|
| C.Ex. 1 | 800 | 56 | + | ++ | -- | -- |
| C.Ex. 2 | 800 | 67 | + | + | -- | - |
| C.Ex. 3 | 800 | 78 | ++ | - | -- | + |
| C.Ex. 4 | 800 | 89 | ++ | -- | n.m. | n.m. |
| C.Ex. 5 | 1050 | 67 | - | + | ++ | - |
| C.Ex. 6 | 1050 | 74 | - | + | ++ | - |
| Ex. 1 | 1050 | 76 | + | + | n.m. | + |
| Ex. 2 | 1050 | 78 | + | + | ++ | + |
| Ex. 3 | 1050 | 80 | + | + | n.m. | + |
| C.Ex. 7 | 1050 | 82 | + | - | n.m. | ++ |
| C.Ex. 8 | 1050 | 89 | + | -- | n.m. | ++ |
| C.Ex. 9 | 1050 | 100 | ++ | -- | n.m. | ++ |
| C.Ex. 10 | 1300 | 67 | -- | + | n.m. | n.m. |
| C.Ex. 11 | 1300 | 78 | - | -- | n.m. | n.m. |

Note:
n.m. = not measured.

What is claimed is:

1. A vinyl chloride resin composition having good powder-dripping and melting properties for powder molding, which is obtained by a method comprising the steps of dry-blending 100 parts by weight of a granular vinyl chloride resin having an average polymerization degree of between 1000 and 1200 and an average particle size of between 50 and 300 μm and 75 to 81 parts by weight of a trimellitate plasticizer to obtain an intermediate composition, and dispersing 2 to 20 parts by weight of a fine powder vinyl chloride resin having an average polymerization degree of between 600 and 1000 and an average particle size of between 0.1 and 10 μm in said intermediate composition.

2. A vinyl chloride resin composition according to claim 1, wherein said fine powder vinyl chloride resin has an average polymerization degree of between 700 and 900.

3. A vinyl chloride resin composition according to claim 1, wherein the amount of said fine powder vinyl chloride resin is between 7 and 13 wt. parts per 100 wt. parts of the granular vinyl chloride resin.

4. A method for preparing a vinyl chloride resin composition having good powder-dripping and melting properties for powder molding comprising the steps of
    dry-blending 100 parts by weight of a granular vinyl chloride resin having an average polymerization degree of between 1000 and 1200 and an average particle size of between 50 and 300 μm and 75 to 81 parts by weight of a trimellitate plasticizer to obtain an intermediate composition, and
    dispersing 2 to 20 parts by weight of a fine powder vinyl chloride resin having an average polymerization degree of between 600 and 1000 and an average particle size of between 0.1 and 10 μm in said intermediate composition.

5. A method according to claim 4, wherein said fine powder vinyl chloride resin has an average polymerization degree of between 700 and 900.

6. A method according to claim 4, wherein the amount of said fine powder vinyl chloride resin is between 7 and 13 wt. parts per 100 wt. parts of the granular vinyl chloride resin.

7. A vinyl chloride resin composition according to claim 1, wherein the amount of said trimellitate plasticizer is from 76 to 80 parts by weight.

8. A method according to claim 6, wherein the amount of said trimellitate plasticizer is from 76 to 80 parts by weight.

9. A vinyl chloride resin composition having good powder-dripping and melting properties for powder molding, which is obtained by a method comprising the steps of
    dry-blending 100 parts by weight of a granular vinyl chloride resin having an average polymerization degree of between 1000 and 1200 and an average particle size of between 50 and 300 μm and 75 to 81 parts by weight of a trimellitate plasticizer to obtain an intermediate composition, and
    dispersing 2 to 20 parts by weight of a fine powder vinyl chloride resin having an average polymerization degree of between 600 and 1000 and an average particle size of between 0.1 and 10 μm in said intermediate composition, wherein the composition has very low glass hazing and good elongation at low temperatures.

* * * * *